(No Model.) 2 Sheets—Sheet 1.
N. N. HORTON.
VEHICLE WHEEL.
No. 465,135. Patented Dec. 15, 1891.
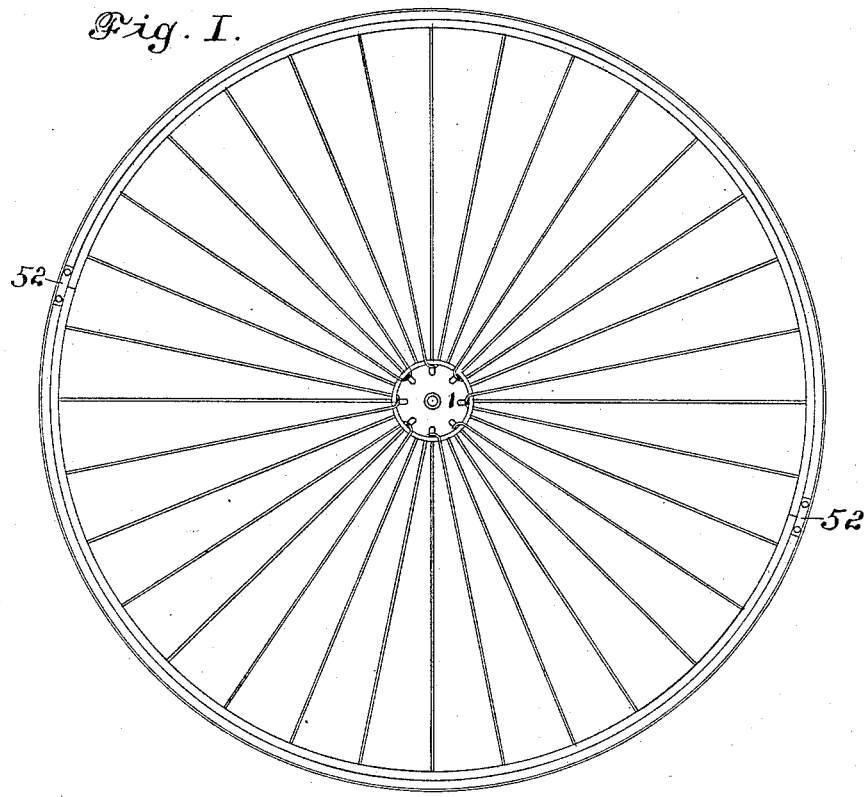
Fig. I.
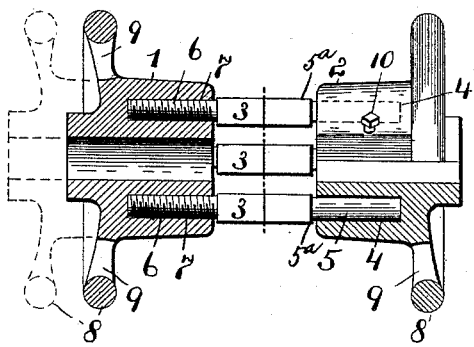
Fig. II.
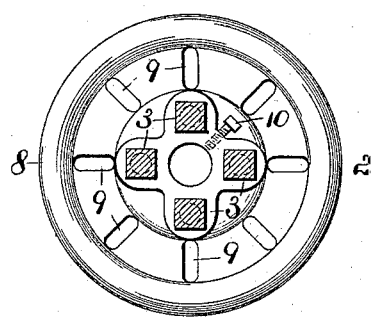
Fig. III.
Witnesses:
F. G. Fischer
George E. Cruse
Inventor:
N. N. Horton.
By Knight Bros.
Attys.

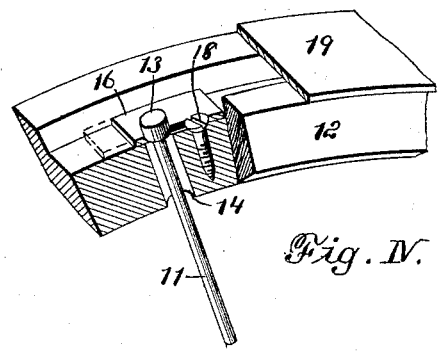

UNITED STATES PATENT OFFICE.

NUMON N. HORTON, OF KANSAS CITY, MISSOURI.

VEHICLE-WHEEL.

SPECIFICATION forming part of Letters Patent No. 465,135, dated December 15, 1891.

Application filed February 24, 1891. Serial No. 382,482. (No model.)

*To all whom it may concern:*

Be it known that I, NUMON N. HORTON, of Kansas City, in the county of Jackson and State of Missouri, have invented certain new and useful Improvements in Vehicle-Wheels, of which the following is a full, clear, and exact description, reference being had to the accompanying drawings, which form a part of this specification.

My invention relates to certain new and useful improvements in vehicle-wheels, which may be used on either bicycles, carriages, or other vehicles, as may be desired; and my invention consists in certain features of novelty hereinafter described, and pointed out in the claims.

Figure I is a side elevation of my improved wheel. Fig. II is a transverse section of the hub as applied to bicycles and kindred vehicles. Fig. III is a transverse section showing the construction of the rim of the hub and showing the spreaders in section. Fig. IV is an enlarged detail perspective of the felly of my improved wheel, showing the manner of attaching the spokes. Fig. V is a perspective of the plate with which the outer end of the spoke engages. Fig. VI shows a modification of the means for attaching the spokes. Fig. VII is a plan view of the plate for holding the spoke in said modification. Fig. VIII shows another modification for securing the spoke to the rim or felly. Fig. IX is a perspective view of the rivet and washer used in said modification. Fig. X is an elongated section showing my improved hub as applied to carriages and other kindred vehicles. Fig. XI is a transverse section of the same, showing the means for securing the boxing in the hub.

Referring to the drawings, 1 2 represent the different sections of my improved hub, which are adjustably secured to each other by spreaders 3, of which there may be any desired number. I have shown four, but do not limit myself to this number. The section 2 of the hub is provided with a recess 4, into which fits unthreaded contracted extensions 5 of the spreaders 3, forming the shoulders 5ⁿ, the opposite ends of the spreaders having screw-threaded extensions 6, which engage in threaded openings 7 in the section 1 of the hub, and the central portions being squared for the convenient operation with a wrench. By means of the spreaders 3 the parts 1 2 of the hub may be adjusted laterally, in order to increase or diminish the tension in the spokes of the wheel. Each of said sections of the hub are provided with flanges 8, having elongated openings 9, through which the spokes pass, and which permit a sufficient amount of play in said spokes to make the wheel more elastic. The section 2 of the hub is secured rigidly to the boxing by means of a set-screw 10. The outer ends of the spokes 11 are preferably secured to the rim or felly 12 of the wheel by the head 13 on said spokes passing through an opening 14 in the rim, and through an opening 15 in a sliding spoke-retaining plate 16, which is countersunk into the outer side of said rim, as shown in Fig. IV. After the head 13 has been passed through the opening 15, the plate is then forced endwise in its seat, the spoke 11 passing into the slot 17 in the plate 16. The head 13, being larger than this slot, prevents the spoke from being withdrawn, and the spoke is held in engagement with said slot by means of a screw or bolt 18, which engages in the opening 15 and with the rim 12. After the spoke has thus been secured, the tire 19 is placed on the rim and the spoke held securely in its connection with the rim, but which may at any time be removed, for the purpose of repairs, &c., by removing the tire, removing the bolt or screw 18, sliding the plate 16 to the position shown in dotted lines, Fig. IV, and thus allowing the spoke to pass out again through the opening 15.

Fig. VI shows a modification whereby my spoke may be attached or detached from the inner side of the rim 12 without removing the tire. This is accomplished by bolts 20 21, which are passed through the rim before the tire is placed thereon, having their heads countersunk, so as not to interfere with the tire, the rim 12, having a recess into which the head 13 of the outer end of the spoke passes, said head passing through a circular opening 32 in a plate 33, the spoke then passing into a slot 34 in connection with said circular opening, which is of smaller diameter than the head 13, whereby the spoke is securely held by said plate 33, the plate being secured to the rim by the bolt 21, passing through an opening 35 in said plate, and the bolt 20, passing through the opening 32, over which fits a washer 36, the washer pressing against the spoke 11 and holding the same from lateral movement.

In my modification as shown in Fig. VIII, I take the ordinary bicycle-rim, as shown at 37, and form a circular opening 38 through the center of the same and a slot 39 in connection with said opening. The head 13 of the spoke 11 is passed through the opening 38, and the spoke is slid into the slot 39, which, being smaller in dimension than the head 13, prevents the same from being withdrawn. To prevent the spoke from passing back into the circular opening 38, I insert the rivet 40 therein, place the washer 41 thereon, and clinch the end of the rivet, as shown at 42, Fig. VIII, after which the rubber tire 43 is placed in position.

In Figs. X and XI, I have shown my improved device as applied to carriages, buggies, and other kindred vehicles, the spreaders 3 being used in the same manner as shown in Fig. II, or as in a bicycle-wheel. The sections 1 and 2 of the hub have cup-shaped portions 44 45, which form sand bands or cups at each end of the spindle.

46 represents a spindle, which is secured to the hub by the usual nut 47. The boxing 48 of the hub is provided with wings 49, which pass into the openings 50 in the section 1 of the hub, and are secured to said section by means of pins 51, which pass through section 1 of the hub and through said wings, thus connecting the boxing rigidly with the hub.

It will be seen that by the use of my device I am enabled to form a vehicle-wheel with a hub having a wide base in which the points of connection of the spokes are distant from each other and thereby brace each other, and by means of my improved spreaders any degree of tension desired may be easily acquired by the use of a wrench, which can be readily applied to the portion 3 of the said spreaders.

The rim of my wheel can be made in sections, as shown in Fig. I, and secured to each other by plates 52. By this means I can fold up or knock down my wheel for convenience in shipping, &c.

I claim as my invention—

1. As an improved article of manufacture, a vehicle-wheel having a hub composed of two sections, one of said sections being provided with recesses 4 and the other section being provided with threaded openings 7, and a series of spreaders having non-threaded extensions fitting in the recesses 4, threaded extensions engaging in the threaded openings 7, and suitable squared faces for the application of a wrench for rotating them, substantially as described, and for the purposes set forth.

2. As an improved article of manufacture, a vehicle-wheel having a hub composed of two sections, one of said sections being provided with threaded recesses and the other with non-threaded recesses, and a series of spreaders adjustably connecting said sections, each of said spreaders being provided with a screw-threaded extension 6 on one end which engages in a threaded recess of one section, and an unthreaded contracted portion 5, provided with a shoulder $5^a$, which operates in a non-threaded recess of the other section, substantially as and for the purpose described.

3. In a vehicle-wheel, the combination of the sections 1 2, spreaders 3, connecting the same, set-screw 10, for securing one of the said sections with a boxing, and rims or flanges 8 on said sections, to which the inner ends of the spokes can be connected, substantially as set forth.

4. As an improved article of manufacture, a vehicle-wheel having a hub formed in sections, spreaders between said sections for adjusting the same, and cup-shaped portions on the outer ends of each of said sections, substantially as described, and for the purpose set forth.

5. As an improved article of manufacture, a vehicle-wheel having its hub formed in sections, spreaders connecting said sections, cup-shaped portions on the outer end of said sections, and means for securing spokes to said sections, substantially as described, and for the purpose set forth.

6. As an improved article of manufacture, a vehicle-wheel having sections, spreaders for adjusting the connection of said sections, and boxing connected with said sections by wings 49, which pass into openings 50 in one of said sections and are secured thereto by a pin 51, passing through said wings and through said section, substantially as and for the purpose set forth.

7. As an improved article of manufacture, a vehicle-wheel having an opening in its rim through which a spoke passes, and a spoke-retaining plate adjustably secured on said rim, said adjustable retaining-plate having an opening of sufficient size to admit the enlargement on the end of the spoke, and an opening of smaller size joined to said larger opening and adapted to engage the enlargement of the spoke, whereby when the plate is moved laterally the spoke will be secured to the rim, substantially as and for the purpose set forth.

8. As an improved article of manufacture, a vehicle-wheel having openings in its rim through which the spokes pass, and spoke-retaining plates countersunk into the outer face of said rim and adjustably secured thereto, each of said plates having an opening of sufficient size to admit the head of the spoke, and an opening of smaller size joined to said larger opening and which will not admit of the passage of the spoke-head, whereby when the plate is moved laterally the spoke will be secured to said rim, substantially as and for the purpose set forth.

9. As an improved article of manufacture, a vehicle-wheel having a rim with an opening through which a headed spoke may be passed, a plate on the outer side of said rim having an opening of sufficient dimensions to admit the head of the spoke, and an opening of smaller dimensions joined to said larger opening which will not permit the passage of said spoke, and a bolt or its equivalent engaging in the larger opening and connecting the said plate with the rim, substantially as and for the purpose described.

10. As an improved article of manufacture, a vehicle-wheel having a rim with a recess on its under side, a spoke having a head which passes into said recess, a plate having an opening of sufficient size to admit said head, and an opening of smaller size which prevents the passage of said head, a bolt and washer connected with said rim and passing through said larger opening, and an additional bolt connected with the rim passing through a separate opening in said plate, substantially as and for the purpose set forth.

11. As an improved article of manufacture, a vehicle-wheel having a rim with an opening of sufficient size to receive the head of a spoke, an opening of smaller dimensions to prevent the passage of said head, and a rivet and washer connected with said larger opening in order to prevent the lateral movement of said spoke, substantially as set forth.

12. In a vehicle-wheel, the combination of the hollow rim 37, opening 38, spoke 11, having a head 13, which passes through the opening 38, an opening 39, of reduced size, in which the spoke may be inserted, a rivet 42 and washer 41, whereby said rivet may be secured in said opening 38, and a rubber tire 43, in connection with said hollow rim, substantially as and for the purpose described.

NUMON N. HORTON.

Witnesses:
JAS. E. KNIGHT,
F. E. MULLETT.